Sept. 13, 1932.    H. T. THOMAS ET AL    1,876,791
TWO-SPEED AXLE
Filed Sept. 16, 1929
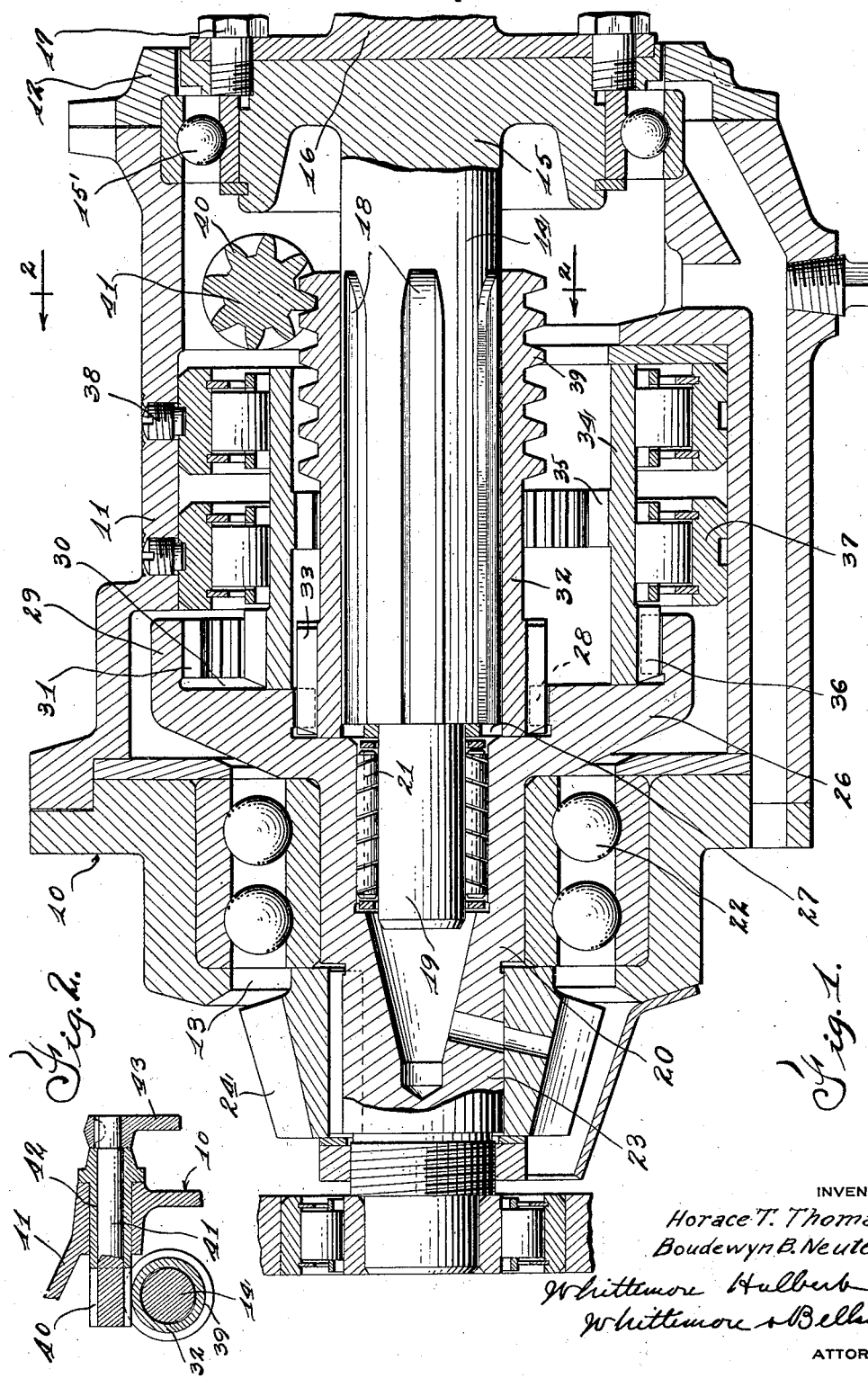
INVENTORS
Horace T. Thomas
Boudewyn B. Neuteboom
Whittemore Hulbert
Whittemore & Belknap
ATTORNEYS Patented Sept. 13, 1932

1,876,791

UNITED STATES PATENT OFFICE

HORACE T. THOMAS AND BOUDEWYN B. NEUTEBOOM, OF LANSING, MICHIGAN, ASSIGNORS TO REO MOTOR CAR COMPANY, OF LANSING, MICHIGAN, A CORPORATION OF MICHIGAN

TWO SPEED AXLE

Application filed September 16, 1929. Serial No. 392,906.

This invention relates generally to variable speed transmissions and has particular reference to selective speed mechanism associated with the driving axle of a vehicle.

One of the primary objects of this invention is to provide a practical and efficient two speed driving axle comprising variable speed gearing of the slidable type capable of being controlled from a convenient point within the vehicle.

With the foregoing, as well as other objects in view, the invention resides in the peculiar construction of the transmission and the manner in which the same operates to produce the desired results.

In the drawing:

Figure 1 is a longitudinal sectional view through a transmission constructed in accordance with this invention; and Figure 2 is a detail sectional view taken on the line 2—2 of Figure 1.

Referring now to the drawing, it will be noted that there is illustrated in Figure 1 a transmission 10 comprising a casing 11 having open front and rear ends 12 and 13 respectively. Extending axially within the housing 11 is a drive shaft 14 having an enlarged head portion 15 journaled within the forward end of the housing 11 by means of the bearings 15' and secured to the propeller shaft 16 by means of the bolts 17. The drive shaft 14 is provided intermediate the ends thereof with a series of splines 18 and terminates at the rear end thereof in a reduced portion 19 journaled within the forward end of a driven element 20 by means of the bearings 21. The driven element 20 is journaled intermediate the ends thereof within the rear end of the casing by means of the bearings 22 and is provided with a reduced portion 23 projecting rearwardly from the housing and secured to the beveled drive pinion 24 forming part of the differential gearing (not shown). The forward end of the driven element 20 is provided with a radially extending flange 26 having an annular recess 27 in the front face thereof formed with inwardly extending teeth 28 surrounding the drive shaft 18 and arranged coaxially therewith. The radial flange 26 terminates in a lateral annular flange 29 forming a recess 30 of substantially greater diameter than the recess 27 and having a series of inwardly extending teeth 31 arranged co-axially with the teeth 28.

Slidably engaging the splines 18 of the shaft 14 is a sleeve 32 having teeth 33 formed on the rear end thereof adapted to mesh with the teeth 28 for directly coupling the driven element to the drive shaft. Surrounding the sleeve 32 is an eccentric 34 having longitudinally spaced internal and external teeth 35 and 36 respectively. The external teeth 36 of the eccentric are arranged in constant mesh with the teeth 31 while the internal teeth 35 are arranged to be engaged with the teeth 33 on the sleeve when the latter is moved rearwardly from the position thereof illustrated in Figure 1. The eccentric 34 is rotatably supported within the housing by means of the roller bearings 37 engageable with the outer surfaces of the eccentric and secured to the housing by means of the set screws 38.

For sliding the sleeve 32 longitudinally of the drive shaft 14 to effect alternate engagement of the teeth 33 on the sleeve with the teeth 28 or 35, the following construction is provided: As shown, the forward end of the sleeve is provided with a series of teeth 39 forming a rack and adapted to mesh with a pinion 40 mounted on the inner end of a shaft 41 which in turn extends transversely of the housing 11 and is journaled in one wall thereof as indicated at 42. The outer end of the shaft 41 preferably projects through the wall aforesaid of the housing and has secured thereto an actuation lever 43 which may be connected to suitable control mechanism (not shown) arranged conveniently within the vehicle.

While it is believed that the operation of the transmission will be thoroughly understood from the foregoing description, nevertheless a brief outline thereof will be given at this time. Assuming that the various parts are in the position illustrated in Figure 1 wherein the differential pinion 24 is connected directly to the propeller shaft 16 and it is desired to obtain different speed ratios, the lever 43 is merely rotated in a counterclockwise direction which imparts a corresponding rotation to the gear 40. Rotation of the gear 40 in this latter direction causes movement of the sleeve 32 forwardly to disengage the teeth 33 from the teeth 28 and to engage the former teeth with the teeth 35 on the eccentric, thereby effecting a reduced speed owing to the relation of the intermeshing teeth 36 and 31 on the eccentric 34 and driven element respectively.

Thus from the foregoing, it will be apparent that we have provided variable speed means interposed between the driving pinion of the differential and the propeller shaft and operable to actuate the driving wheels of the vehicle at variable speeds irrespective of other variable speed units which may be used in connection therewith. It will further be apparent that we have accomplished the foregoing with a comparatively simple and practical selective gear shift unit which is quiet in operation and capable of being readily assembled and economically manufactured.

What we claim as our invention is:

A two speed drive axle comprising a casing, a driving element, a driven element axially aligned with said driving element and having a beveled drive pinion and a longitudinal bore, a bearing in said bore rotatably receiving one end of said driving element, a bearing surrounding and rotatably mounting said driving element within said casing, said driven element having an internal tooth clutch element and an internal gear of larger diameter than said clutch element, a sleeve eccentrically mounted within said casing and having at one end therof an external gear meshing with said internal gear, said sleeve having an internal gear closely spaced in a longitudinal direction to said external gear and having a portion projecting from said internal gear in the opposite direction from said external gear, a bearing surrounding said projecting portion of said sleeve, a second sleeve non-rotatably and slidably mounted on said driving element within said first mentioned sleeve, the second mentioned sleeve having a spur gear at one end thereof arranged intermediate the tooth clutch element on said driven shaft and said internal gear on said first mentioned sleeve and adapted to alternately engage the same, said second mentioned sleeve having annular teeth thereon arranged beneath said projecting portion of said sleeve and extending laterally beyond the same and a pinion laterally spaced with respect to said bearing engaging the portion of said annular teeth projecting beyond said first mentioned sleeve and adapted to longitudinally shift said second mentioned sleeve during the rotation thereof with said drive element.

In testimony whereof we affix our signatures.

HORACE T. THOMAS.
BOUDEWYN B. NEUTEBOOM.